3,535,281
STABILIZED CAPPED POLY(PHENYLENE OXIDE) COPOLYMERS
Allan S. Hay, Schenectady, N.Y., assignor to General Electric Company, a corporation of New York
No Drawing. Filed Dec. 23, 1968, Ser. No. 786,403
Int. Cl. C08g 23/22, 23/24
U.S. Cl. 260—47
3 Claims

ABSTRACT OF THE DISCLOSURE

Capped poly(phenylene oxide) copolymers, having a number average molecular weight of at least 10,000, whose repeating units have both the formula (A) 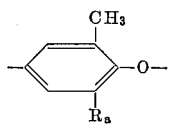

and

B) 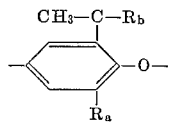

where $R_a$ is methyl or phenyl and $R_b$ is phenyl, chlorophenyl or methylphenyl, the B units being from 1 to 20 mole percent of the total of A and B units, have been found to be color-stabilized at elevated temperatures. Because of this stability, these compositions can be used to prepare molded objects which have improved color retention at elevated temperatures.

STABILIZED CAPPED POLY(PHENYLENE OXIDE) COPOLYMERS

This invention relates to poly(phenylene oxides) which are color-stabilized at elevated temperatures. More specifically, this invention relates to capped poly(phenylene oxide) copolymers in which at least one, but not all of the repeating units of the copolymers has a substituent having a secondary α-carbon atom in the 2 or 2 and 6 positions relative to the oyxgen of the phenylene ether unit. Such compositions have been found to be more stable towards discolorization at elevated temperatures than the capped polymers not containing a secondary α-carbon atom.

Poly(phenylene oxides), sometimes called polyphenylene ethers, as a general class, are an extremely interesting group of new polymers. These polymers, both homopolymers and copolymers, and processes for producing them are disclosed in my U.S. Pat. Nos. 3,306,874, 3,306,875, and 3,432,466, all assigned to the same assignee as the present invention which are incorporated herein by reference. These poly(phenylene oxides) have many desirable properties and have found wide commercial acceptance. Generally, these poly(phenylene oxides) are poly(2,6-disubstituted 1,4-phenylene oxides) which are made by oxidative coupling of 2,6-disubstituted phenols.

For high temperature applications in the presence of air or other oxygen containing gas, it has been found that these poly(phenylene oxides) preferably should be capped, i.e., have the terminal hydroxyl group converted to a substituent which is oxidatively stable. This can be done by the general procedures used for capping hydroxyl-terminated polymers, but preferably by hot-capping as disclosed and claimed in U.S. Pat. No. 3,375,228, Holoch and VanSorge which also develops and caps any incipient hydroxyl groups. However, it has been noticed that those capped poly(phenylene oxides) containing an alkyl substituent on the benzene nucleus are also somewhat reactive with oxygen. On long exposure to high temperatures in the presence of an oxygen containing gas, these alkyl groups are themselves slowly oxidized causing cross-linking and some discoloration of the polymer to occur.

Investigation of various alkyl substituents on the phenylene oxide repeating units showed that those containing secondary α-carbon atom, for example, an isopropyl, isobutyl, α-phenylethyl, etc., substituent, are more prone to this oxidative attack than are the straight chain alkyl groups which contain a primary α-carbon atom. For example, the polymer from 2,6-diisopropylphenyl is more subject to this oxidative attack than is the polymer from 2-methyl-6-isopropylphenol which in turn is more subject to oxidative attack than the polymer from 2,6-dimethylphenol. This susceptibility to oxidative attack is also present in copolymers, prepared from these phenols. It was indeed quite surprising, therefore, to find that a capped poly(phenylene oxide) copolymer made from a mixture of phenols in which at least one of the phenols had a substituent having a secondary α-carbon atom and one did not, were more stable to discoloration at elevated temperatures than polymers or copolymers made from phenols which had alkyl groups which were all primary α-carbon atoms especially since the reverse was true for the uncapped copolymer. It was further discovered that when the secondary α-carbon atom had a phenyl group directly attached, for example, as in α-phenylethyl, the effect on the copolymers was greater than if the substituent was all aliphatic, for example, isopropyl.

The amount of phenol containing the secondary α-carbon atom required in the copolymer needs to be only in the range of from 1 to 20 mole percent of the total amount of the phenols which are oxidatively coupled to prepare the poly(phenylene oxide) copolymers. Surprisingly enough it was found that those copolymers containing 3 to 6 mole percent of this phenol, for some unknown reason, had a lower glass transition temperature than the copolymers containing less or higher amounts, permitting lower molding temperatures to be used.

Although phenols containing two secondary α-carbon atoms can be used to make poly(phenylene oxides), such phenols simultaneously produce relatively large amounts of the corresponding diphenoquinones. This tendency to produce diphenoquinones is reduced in making copolymers, but is still evident, therefore, it is more desirable, although not necessary, to use those phenols which contain only one substituent which contains a secondary α-carbon atom.

The capped poly(phenylene oxide) copolymers, which I have found are thermally stable, are those capped copolymers in which 1 to 20 mole percent of the repeating units of the copolymer are 2,6-disubstituted phenylene oxide units in which one or both substituents contain a secondary α-carbon atom with the balance of the repeating units being 2,6-disubstituted phenylene oxide units wherein one substituent is straight chain alkyl and the other substituent is straight chain alkyl or aryl. In order that such copolymers have any useful properties, the copolymers should have a number average molecular of at least 10,000. Such capped poly(phenylene oxides) would have repeating units having the formula (I) 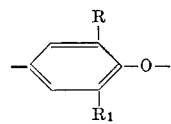

and the formula (II) 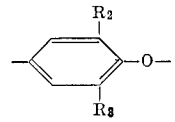

where R is straight chain alkyl, straight chain haloalkyl wherein the halogen is on other than the α-carbon atom or straight chain aralkyl wherein the aryl is on other than the α-carbon atoms, $R_1$ is the same as R and, in addition, aryl or haloaryl, $R_2$ is alkyl, including aralkyl, having a secondary α-carbon atom and $R_3$ is any one of the substituents defined by $R_1$ and $R_2$. Typical examples of the substituents that R, $R_1$, $R_2$ and $R_3$ can be and means of making these copolymers are disclosed in my above referenced patents.

Increasing the chain length of the substituents on the benzene nucleus of the phenylene oxide repeating units does not impart any outstanding properties to the poly(phenylene oxides) over that obtained when the substituents have a lower number of carbon atoms. Furthermore, many of the phenols with such longer chain length substituents are not as readily available as those having the shorter chain length. As mentioned above, the aralkyl groups having a secondary α-carbon atom are more effective than alkyl groups having a secondary α-carbon atom. Furthermore, one substituent having a secondary α-carbon atom does not favor diphenoquinone formation to the extent that two such substituents do. Therefore, the particular poly(phenylene oxides) which are preferred for this invention are those poly(phenylene oxides) within the broad class described above which are capped poly(phenylene oxide) copolymers, having a number average molecular weight of at least 10,000, whose repeating units have both the formula (A) 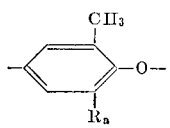

and the formula (B) 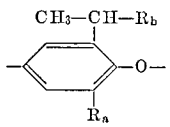

where $R_a$ is methyl or phenyl and $R_b$ is phenyl, chlorophenyl or methylphenyl, the B units being from 1 to 20 mole percent of the total of A and B units.

These copolymers are made, as mentioned previously, by the oxidative coupling of the corresponding phenols. The phenols required to produce the poly(phenylene oxides) having repeating units defined by Formula A are 2,6-dimethylphenol (2,6-xylenol) and 2-methyl-6-phenyl-phenol. The former is readily available as a by-product from coal tar from the direct methylation of either phenol or o-cresol while the latter is readily produced by the direct methylation of o-phenylphenol (2-phenylphenol) with high selectivity of the ortho methylation as disclosed and claimed in U.S. Pat. 3,446,856, Stephen B. Hamilton, Jr., assigned to the same assignee as the present invention.

The phenols required to produce the poly(phenylene oxides) having repeating units corresponding to Formula B are readily available by the reaction of styrene or the corresponding nuclear chlorinated or nuclear methylated styrenes with either o-phenylphenol or o-cresol, to produce 2-phenyl-6-(α-phenylethyl)phenol, 2-methyl-6-(α-phenylethyl)phenol or the above mentioned α-phenylethyl substituted phenols wherein the phenyl nucleus of the phenylethyl substituent has from 1 to 5, preferably 1 to 2, chlorine or methyl substituents, e.g., 2-methyl-6-[α-(4-chlorophenyl)ethyl]phenol, 2-methyl-6-[α-(2,4-dimethylphenyl)ethyl]phenol, etc.

In making the copolymers, the individual phenols may be mixed prior to oxidatively coupling or one of the phenols may be oxidatively coupled and the other phenol or phenols to be copolymerized may be added thereafter to produce segmented copolymers. In general, the oxidative coupling reaction is carried out by passing air or other oxygen containing gas into a solution of an amine-basic cupric salt complex in an inert solvent, for example, toluene or benzene, which also either contains the phenols to be oxidatively coupled or the phenols are added over a period of time to the reaction mixture. Further details of this oxidative coupling reaction are disclosed in the above referenced patents.

After the oxidative coupling reaction is completed, the catalyst residue is removed or deactivated, for example, by washing the copolymer solution with water, generally containing an acid to extract the catalyst, by addition of a strong chelating agent, by adding a precipitant for copper or by precipitation of the polymer from the reaction mixture. Since the capping reaction is effected in a solution of the polymer, the catalyst is generally separated from or deactivated in the solution of the polymer to avoid having to redissolve the polymer prior to capping.

The capping reaction is carried out to convert the terminal hydroxyl groups to substituents which are inert to an oxygen containing atmosphere at elevated temperatures. Various means can be used to cap the poly(phenylene oxide) copolymer, for example, ester groups can be formed on the hydroxyl groups by reaction with acid anhydrides or acyl halides. Ether substituents can be introduced by reaction with etherifying agents, for example, dimethylsulfate, alkyl halides in the presence of base and copper, etc. They may be simultaneously decolorized and capped by reacting with an alkali metal adduct of a diaryl ketone and then reacted with a wide variety of capping agents as more fully disclosed in my U.S. Pat. 3,402,143, assigned to the same assignee as the present invention. They may also be hot-capped with a wide variety of capping agents by the procedure shown in the previously mentioned U.S. Pat. 3,375,228, which has the added benefit of causing incipient hydroxyl groups to be generated and simultaneously capped.

Prior to or simultaneously with capping, the copolymer may be reduced by treatment with a metal and alkanoic acid as more completely disclosed in the copending application of Arnold Factor, Ser. No. 786,475, filed concurrently herewith and assigned to the same assignee as the present invention, which is incorporated herein, by reference. This latter process when applied to the copolymers of this invention to produce the capped polyphenylene ether copolymers produces a final product having the maximum light transmission after a given period of heat-aging. However, the actual procedure used for the production of the capped copolymer does not form a part of this invention. Therefore, any of the various methods of capping may be used.

In order that those skilled in the art may better understand my invention, the following examples are given by way of illustration and not by way of limitation. In all of the examples, parts and percentages are by weight and temperature is reported in degrees centigrade unless otherwise stated.

EXAMPLE 1

This example gives the general procedure used for the making of the copolymers. Oxygen was bubbled into a well stirred solution of 0.1 g. of cuprous chloride, 0.59 g. of trimethyl amine, 0.15 ml. of N,N,N',N'-tetramethylethylenediamine and 100 ml. of benzene in which 10 g. of anhydrous magnesium sulfate was suspended. After all of the cuprous chloride had dissolved, 10 g. of the total weight of the mixture of phenols dissolved in 30 ml. of benzene was slowly added over a period of 15 minutes. Addition of the phenol solution caused an exothermic reaction to occur. In general, the reaction was run until the indicated intrinsic viscosity of the polymer was approximately 0.6 dec. l./g. as measured in chloroform in 25° C. This was done by using a calibrated pipette for which a calibration chart had been made which related the flow time from the pipette to the intrinsic viscosity of the polymer in solution. In general, this required a reaction time of about 90 minutes after addition of the phenol was completed.

In order to provide a sample of the copolymer which had not been capped, designated nc in the following tables, a portion of the reaction mixture was poured into methanol which had been acidified with aqueous hydrochloric acid to precipitate the polymer which was then redissolved and reprecipitated several times and filtered and dried. To provide a sample of the polymer which had been capped at ambient conditions, designated ac in the following tables, a portion of the polymer solution was treated with a sufficient amount of diethylenetriamine to inactivate the copper catalyst by chelating the copper ion. After filtering the polymer solution, a sufficient amount of the lithium ketyl of benzophenone was added until the color of the ketyl persisted in the solution. This reaction converts all of the hydroxyl groups of the polymer to their corresponding lithium salts. Based on the amount of lithium which reacted with the polymer, an excess of the calculated amount of acetic anhydride was added to form acetate esters with the hydroxyl groups of the polymer (acetate capped). This capped polymer was then isolated by pouring the solution of the polymer into methanol, redissolving and reprecipitating several times, filtering the polymer and then drying.

Where the copolymers were hot-capped to not only cap the existing hydroxyl groups, but also develop and cap the incipient hydroxyl groups, designated as hc in the following tables, the polymer was first isolated as mentioned above, redissolved in benzene and then acetic anhydride added to the solution and put into a pressure container and heated to 250° C. for 15 minutes. After cooling, the polymer was isolated in the same way as mentioned above.

The use of acetic anhydride to cap the polymers is to demonstrate the effect of capping. Similar results are also obtained when the other capping agents discussed above are used in place of the acetic anhydride. In some of the following examples the polymer was capped at ambient conditions, followed by hot-capping to determine the effect of this dual treatment. They are designated as ac+hc in the following tables.

In the following examples, the stabilizing effect, i.e., the resistance towards discoloration, at elevated temperatures, was determined by noting the time in hours for the light transmission of 13–15 mil films made from these polymers to decrease to 80% of the initial value when heat-aged at 175° C. in an air circulating oven, designated as "hours to 80%" in the following tables. This procedure compensates for any difference in the initial value which will vary dependent on whether or not the polymer has been capped. For example, capping at ambient conditions improves the initial light transmission of the polymer. Therefore, it would not be a valid comparison to compare the time for this capped and the uncapped polymer to reach a particular light transmission value since even if the two polymers aged at the same rate, i.e., had the same stability, the capped polymer would require a longer time to reach the particular value. The values for the control are the comparable values for the homopolymer of the phenol, for example 2,6-dimethyl phenol, not containing the substituent having the secondary α-carbon atom used in making the copolymer of the example. A comparison of the value for the copolymer and the homopolymer shows the improvement in stability towards heat-aging obtained by making the copolymers and also the necessity for capping of the copolymer.

EXAMPLE 2

A copoly(phenylene oxide) containing essentially 1 mole percent of repeating units having substituents with a secondary α-carbon atom was prepared by oxidatively coupling 2,6-xylenol containing 1.16 mole percent, 2-methyl-6-(α-phenylethyl)phenol. The results on heat-aging are shown in Table I.

TABLE I
[Hours to 80%]

|  | nc | ac+hc |
|---|---|---|
| Control | 10 | 35 |
| Copolymer | 6 | 42 |

When this example was repeated but the amount of 2-methyl-6-(α-phenylethyl)phenol reduced to 0.58%, the copolymer was no better than the homopolymer control, thus showing that at least 1 mole percent is necessary to obtain an improvement in stability.

EXAMPLE 3

Example 2 was repeated except that the amount of 2-methyl-6-(α-phenylethyl)phenol in separate copolymers was increased to (a) 1.75, (b) 3.0, (c) 6.0 and (d) 12.6 mole percent, respectively. Another copolymer (e) was prepared from 2,6-dimethylphenol containing 10 mole percent 2-phenyl-6-(α-phenylethyl)phenol. The results are shown in Table II.

TABLE II
[Hours to 80%]

|  | nc | ac | ac+hc | hc |
|---|---|---|---|---|
| Control | 10 | 16 | 35 | 34 |
| Copolymer (a) | 10 | 19 | 58 | 58 |
| Copolymer (b) | 8 | 24 | 52 |  |
| Copolymer (c) | 2 | 38 | 55 |  |
| Copolymer (d) | 2 | 55 | 65 | 73 |
| Copolymer (e) | 2 |  |  | 74 |

Similar results are also obtained when 2-phenyl-6-methylphenol is substituted for the 2,6-xylenol in the above examples. Likewise, similar results are obtained when the corresponding phenols having α-(chlorophenyl)ethyl and α-(methylphenyl)ethyl substituents in place of the α-phenylethyl substituents of the above phenols are used as the phenol having a substituent with a secondary α-carbon atom in the above examples. Stable copolymers are also obtained as the amount of the phenol having a substituent with a secondary α-carbon atom is increased up to 20 mole percent. When the amount exceeds this limit, the stability decreases so there is no advantage to exceeding this amount.

The color-stabilized poly(phenylene oxides of this invention may be used in all the known applications for the poly(phenylene oxides) disclosed in the above referenced patents, for example as molding compositions to produce shaped molded articles, to make fibers and films which can be crystal-oriented if desired by solution or melt spinning and casting techniques. Because of their improved color-stability on heat-aging, as demonstrated above, they are particularly useful in making the above objects which are to be subjected to high temperatures during use.

Obvious modifications to those illustrated above can be made. For example, fillers, dyes, pigments, lubricants, other stabilizers, etc., can be incorporated into the compositions prior to final shaping. Since the polymers are soluble in many readily available solvents, e.g., xylene, benzene, chloroform, etc., solutions of these polymers can be used to form protective coatings on substrates or to provide electrical insulation to metal conductors. These and other obvious modifications will be readily apparent to those skilled in the art and are included within the scope of the appended claims.

What I claim as new and desire to secure by Letters Patent of the United States is:

1. Poly(phenylene oxides) stabilized towards thermal degradation, having a number average molecular weight of at least 10,000, whose repeating units are members of the group consisting of units having the formula (A) 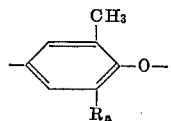

and units having the formula (B) 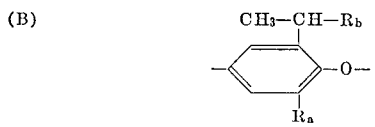

where $R_a$ is methyl or phenyl, and $R_b$ is phenyl, chlorophenyl or methylphenyl, the B units being from 1 to 20 mole percent of the total of A and B units and whose terminal hydroxyl groups have been converted to substituents which are inert to oxygen at elevated temperatures.

2. The poly(phenylene oxides) of claim 1 wherein the A units are 2,6-dimethyl-1,4-phenylene oxide units and the B units are 2-methyl-6-(α-phenylethyl)-1,4-phenylene oxide units.

3. The poly(phenylene oxides) of claim 1 wherein the A units are 2-methyl-6-phenyl-1,4-phenylene oxide units and the B units are 2-methyl-6-(α-phenylethyl)-1,4-phenylene oxide units.

References Cited

UNITED STATES PATENTS

| 3,306,875 | 2/1967 | Hay | 260—47 |
|---|---|---|---|
| 3,375,228 | 3/1968 | Holoch et al. | 260—47 |
| 3,392,146 | 7/1968 | Anderson et al. | 260—47 |
| 3,402,143 | 9/1968 | Hay | 260—47 |
| 3,424,722 | 1/1969 | Jerussi et al. | 260—47 |

FOREIGN PATENTS

| 4,277 | 2/1967 | Japan. |
|---|---|---|
| 22,070 | 10/1967 | Japan. |

WILLIAM SHORT, Primary Examiner

M. GOLDSTEIN, Assistant Examiner

U.S. Cl. X.R.

260—33.6, 33.8